United States Patent [19]
Fujii et al.

[11] Patent Number: 5,393,205
[45] Date of Patent: Feb. 28, 1995

[54] AXIAL MULTI-PISTON COMPRESSOR HAVING ROTARY SUCTION VALVE

[75] Inventors: Toshiro Fujii; Hiromi Kitayama; Kazuaki Iwama, all of Kariya, Japan

[73] Assignee: Kabushiki Kaisha Toyoda Jidoshokki Seisakusho, Aichi, Japan

[21] Appl. No.: 103,884

[22] Filed: Aug. 6, 1993

[30] Foreign Application Priority Data

Aug. 7, 1992 [JP] Japan .................... 4-211167

[51] Int. Cl.6 ............................... F04B 1/12
[52] U.S. Cl. ..................... 417/269; 184/6.17
[58] Field of Search ........... 417/269; 91/499, 502, 91/484; 184/6.17; 137/625.11

[56] References Cited

U.S. PATENT DOCUMENTS

| | | | |
|---|---|---|---|
| 1,925,378 | 9/1933 | Ferris et al. | 91/484 |
| 4,226,572 | 10/1980 | Nakayama et al. | 417/269 |
| 5,172,623 | 12/1992 | Poisson | 184/6.17 |
| 5,207,078 | 5/1993 | Kimura et al | 417/269 |
| 5,232,349 | 8/1993 | Kimura et al. | 417/269 |
| 5,286,173 | 2/1994 | Takenaka et al. | 417/269 |

*Primary Examiner*—Richard A. Bertsch
*Assistant Examiner*—M. Kocharov
*Attorney, Agent, or Firm*—Burgess, Ryan and Wayne

[57] ABSTRACT

A compressor includes first and second cylinder blocks having cylinder bores and surrounding a drive shaft, and the bores of the first block are aligned and registered with the bores of the second block, respectively, the blocks being arranged to define a suction chamber therebetween. First and second housings are associated with the first and second blocks to define first and second discharge chambers therebetween, which are in communication with each other through a central passage of the drive shaft. Double-headed pistons are slidably received in the pairs of aligned bores, respectively, and a conversion mechanism is disposed within the suction chamber for converting a rotation of the shaft into a reciprocation of each piston in the corresponding aligned cylinder bores such that suction and compression strokes are alternately executed. A rotary valve introduces fluid into the bores just after the suction stroke is initiated, and the introduction of fluid is continued until the suction stroke is finished.

6 Claims, 6 Drawing Sheets

AXIAL MULTI-PISTON COMPRESSOR HAVING ROTARY SUCTION VALVE

BACKGROUND OF THE INVENTION (1) Field of the Invention

The present invention relates to an axial multi-piston swash-plate-type compressor used in, for example, an air-conditioning system incorporated in a vehicle such as an automobile.

(2) Description of the Related Art

As disclosed in, for example, Japanese Unexamined Publication No. 3-92587, an axial multi-piston swash-plate-type compressor comprises: front and rear cylinder blocks axially combined to form a swash-plate chamber therebetween, the combined cylinder blocks having the same number of cylinder bores radially formed therein and arranged with respect to the central axis thereof, the cylinder bores of the front cylinder block being aligned and registered with the cylinder bores of the rear cylinder block, respectively, with the swash plate chamber intervening therebetween; double-headed pistons slidably received in the pairs of aligned cylinder bores, respectively; front and rear housings fixed to front and rear end faces of the combined cylinder blocks through the intermediary of front and rear valve plate-assemblies, respectively, the front and rear housings each forming a suction chamber and a discharge chamber together with the corresponding one of the front and rear valve-plate assemblies; a rotatable drive shaft arranged so as to be axially extended through the front housing and the combined cylinder blocks; and a swash plate securely mounted on the drive shaft within the swash plate chamber and engaging with the double-headed pistons to cause these pistons to reciprocate in the pairs of aligned cylinder bores, respectively, by the rotation of the swash plate. The front and rear cylinder blocks, the front and rear valve-plates and the front and rear housings being axially and tightly assembled as an integrated unit by a plurality of long screw bolts extended therethrough.

The front and rear valve-plate assemblies in particular have substantially the same construction in that each comprises: a disc-like member having sets of ports, each set having one suction port and one discharging port, the ports being able to communicate with the corresponding one of the cylinder bores of the front or rear cylinder block; an inner valve sheet attached to the inner side surface of the disc-like member and having suction reed valve elements formed integrally therein, each of which is arranged so as to open and close the corresponding suction port of the disc-like member; an outer valve sheet attached to the outer side surface of the disc-like member and having discharge reed valve elements formed integrally therein, each of which is arranged so as to open and close the corresponding discharge port of the disc-like member; and a gasket attached to the outer valve sheet and hermetically engaged with an end face of a partition wall of the front or rear housing defining the suction and discharge chambers. Each of the front and rear valve plate assemblies is also provided with suction openings aligned with passages formed in the front or rear cylinder block, respectively, whereby the suction chambers formed by the front and rear housings are in communication with the swash plate chamber to which a refrigerant is supplied from an evaporator of an air-conditioning system, through a suitable inlet port formed in the combined cylinder blocks.

In the swash-plate-type compressor as mentioned above, the drive shaft is driven by the engine of a vehicle, such as an automobile, so that the swash plate is rotated within the swash plate chamber, and the rotational movement of the swash plate causes the double-headed pistons to be reciprocated in the pairs of aligned cylinder bores. When each piston is reciprocated in the aligned cylinder bores, a suction stroke is executed in one of the aligned cylinder bores and a compression stroke is executed in the other cylinder bore. During the suction stroke, the suction reed valve element is opened and the discharge reed valve element is closed, whereby the refrigerant is introduced from the suction chamber to the cylinder bore through the suction port. During the compression stroke, the suction reed valve element concerned is closed and the discharge reed valve element concerned is opened, whereby the introduced refrigerant is compressed and discharged from the cylinder bore into the discharge chamber through the discharge reed valve element. The compressed refrigerant is fed from the discharge chamber to the condenser of the air-conditioning system. The refrigerant includes a lubricating oil mist, and the movable parts of the compressor are lubricated with the oil mist during the operation. Also, the oil mist appears on the suction and discharge reed valves, and serves as a liquid-phase seal when each of the reed valve is closed.

Just after the suction stroke is initiated, i.e., just after the head of the piston is from the top dead point toward the bottom dead point, the suction reed valve cannot be immediately opened because the suction reed valve is adhered to the valve seat with the liquid oil, and because a resilient force of the suction reed valve must be overcome before the refrigerant can be introduced from the suction chamber to the cylinder bore through the suction port. Namely, the suction reed valve cannot be opened until a differential between the pressures in the cylinder bore and the suction chamber exceeds a certain level. Further, the suction reed valve may be prematurely closed before the suction stroke is finished, because the reed valve has a tendency toward being returned from the open position to the closed position due to the resilient force thereof. Accordingly, a sufficient amount of the refrigerant cannot be delivered to the cylinder bore during the suction stroke, and thus the conventional compressor cannot exhibit fully the operational performance thereof.

Also, in the compressor as mentioned above, a plurality of through passages is formed in the front and rear cylinder blocks to feed the refrigerant from the swash plate chamber to the suction chamber and to communicate the front and rear discharge chambers with each other. Of course, the mechanical strength of the cylinder blocks is weakened by the formation of the through passages therein. Accordingly, the cylinder blocks must have a large size, resulting in a bulkiness of the compressor.

SUMMARY OF THE INVENTION

Therefore, an object of the present invention is to provide an axial multi-piston swash-plate-type compressor as mentioned above, constituted such that a fluid such as a refrigerant can be sufficiently introduced into a cylinder bore which subjected to a suction stroke, whereby the operational performance thereof can be fully exhibited.

Another object of the present invention is to provide an axial multi-piston swash-plate-type compressor as mentioned above, which can be compactly constructed without lowering the operational performance thereof.

In accordance with an aspect of the present invention, there is provided an axial multi-piston compressor comprising: a drive shaft; a cylinder block having a central axial bore through which the drive shaft is extended, and cylinder bores radially formed therein surrounding the drive shaft; a plurality of pistons slidably received in the cylinder bores of the cylinder block, respectively; a conversion means for converting a rotational movement of the drive shaft into a reciprocation of each piston in the corresponding cylinder bore such that a suction stroke and a compression stroke are alternately executed therein, a gas inclusive of a lubricating-oil mist being introduced into each of the cylinder bores during the suction stroke thereof, and then the introduced gas being compressed and discharged from the cylinder bore during the compression stroke thereof; a rotary suction valve means mounted on the drive shaft and received hermetically in the central axial bore of the cylinder block for allowing the introduction of the gas into each of the cylinder bores during the suction stroke thereof, the rotary suction valve means having a suction passage formed therein and opened on a periphery thereof, each of the cylinder bores having a suction port formed in an inner wall defining the central axial bore of the cylinder block, the suction ports of the cylinder bores being arranged along a circle described by the opening of the suction passage during a rotation of the rotary suction valve means; and a discharge valve means associated with a discharge port positioned at an end face of each of the cylinder bores for allowing the discharge of the compressed gas from the cylinder bore into a discharge chamber during the compression stroke thereof, each of the suction ports being disposed in the vicinity of the discharge port of the corresponding cylinder bore, the suction passage of the rotary suction valve means being arranged such that the introduction of the fluid into the cylinder bore concerned is carried out just after the suction stroke is initiated therein, and is continued until the suction stroke is finished, whereby an operational performance of the compressor can be enhanced, wherein the rotary suction valve means has a small passage formed therein, and the small passage is disposed such that a part of the gas compressed in the cylinder bore concerned is discharged from the cylinder bore into the discharge chamber over a part of an ending period of the compression stroke, whereby the rotary suction valve means can be lubricated.

In accordance with another aspect of the present invention, there is provided an axial multi-piston compressor comprising: a drive shaft; a first cylinder block having cylinder bores formed therein and surrounding the drive shaft; a second cylinder block having cylinder bores formed therein and surrounding the drive shaft, the cylinder bores of the first cylinder block being aligned and registered with the cylinder bores of the second cylinder block, respectively, the first and second cylinder blocks being arranged so as to define a suction chamber therebetween; a plurality of double-headed pistons slidably received in the pairs of aligned cylinder bores, respectively; a first housing associated with the first cylinder block to define a first discharge chamber therebetween; a second housing associated with the second cylinder block to define a second discharge chamber therebetween; the first and second discharge chambers communicating with each other through a central passage formed in the drive shaft; a conversion means disposed within the suction chamber for converting a rotational movement of the drive shaft into a reciprocation of each double-headed piston in the corresponding aligned cylinder bores such that a suction stroke and a compression stroke are alternately executed therein, a gas inclusive of a lubricating-oil mist being introduced from the suction chamber into each of the cylinder bores during the suction stroke thereof, and then the introduced gas being compressed and discharged from the cylinder bore into the corresponding discharge chamber during the compression stroke thereof; a first rotary suction valve means for introducing the gas from the suction chamber into each of the cylinder bores of the first cylinder block during the suction stroke thereof, the first rotary suction valve means having a small passage formed therein, the small passage being disposed such that a part of the gas compressed in the cylinder bore concerned is discharged from the cylinder bore into the first discharge chamber over a part of an ending period of the compression stroke, whereby the first rotary suction valve means can be lubricated; and a second rotary suction valve means for introducing the gas from the suction chamber into each of the cylinder bores of the second cylinder block during the suction stroke thereof, the second rotary suction valve means having a small passage formed therein, the small passage being disposed such that a part of the gas compressed in the cylinder bore concerned is discharged from the cylinder bore into the second discharge chamber over a part of an ending period of the compression stroke, whereby the second rotary suction valve means can be lubricated.

BRIEF DESCRIPTION OF THE DRAWINGS

Other objects and advantages of the present invention will be better understood from the following description, with reference to the accompanying drawings, in which.

DESCRIPTION OF THE PREFERRED EMBODIMENTS

Figure 1:
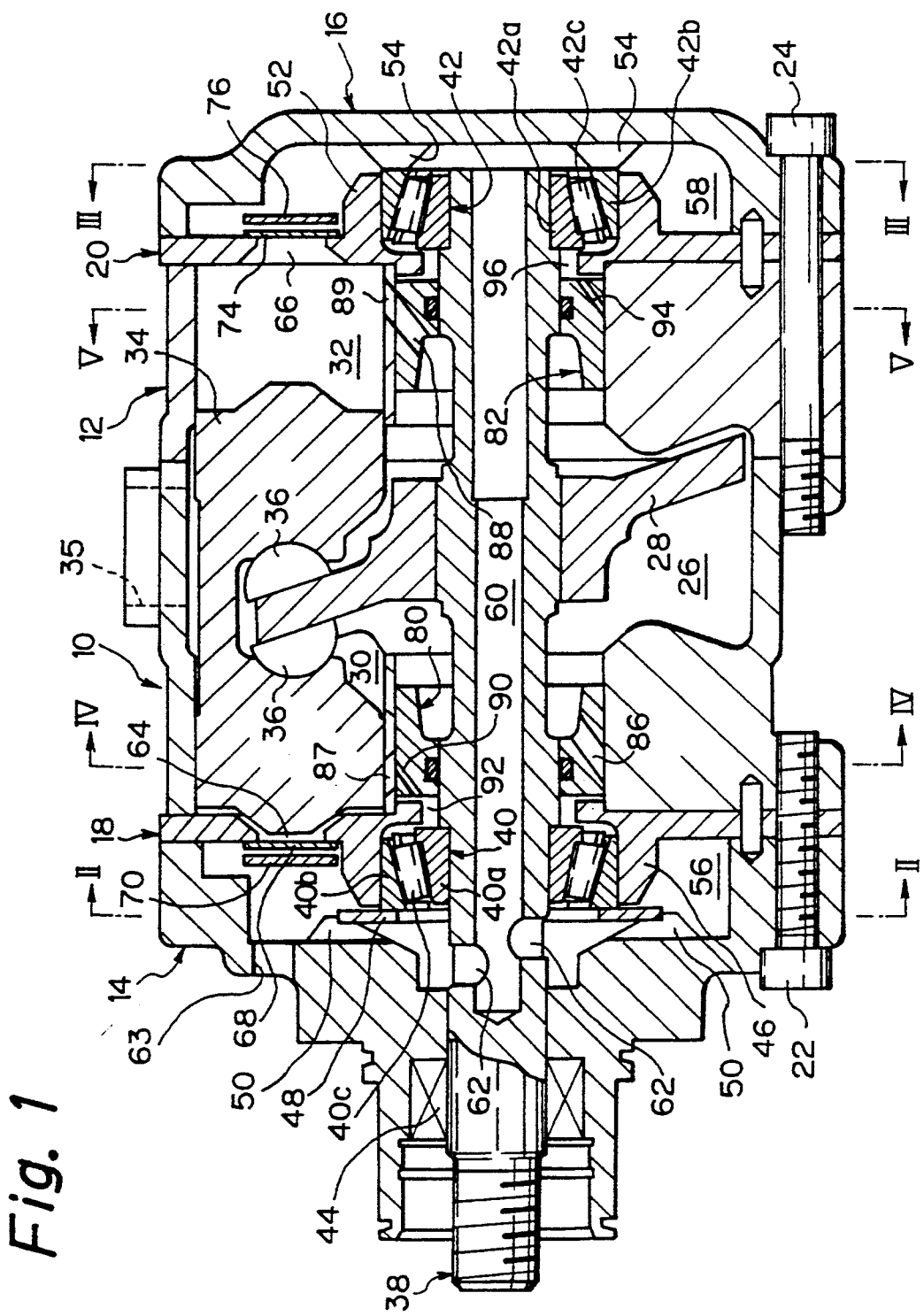
FIG. 1 is a longitudinal cross sectional view of a swash-plate-type compressor according to the present invention.

FIG. 1 shows an axial multi-piston swash-plate-type compressor in which the present invention is embodied, and which is used in an air-conditioning system for a vehicle such as an automobile. The compressor comprises front and rear cylinder blocks 10 and 12 axially aligned and hermetically combined with each other, front and rear housings 14 and 16 applied to end faces of the combined cylinder blocks 10 and 12, respectively, and front and rear annular valve plates 18 and 20 disposed between the front and rear housings 14 and 16 and the end faces of the combined cylinder blocks 10 and 12, respectively. All of these parts are assembled as an integrated unit by two sets of five screws 22 and 24 (FIGS. 2 to 5).

Figure 4:
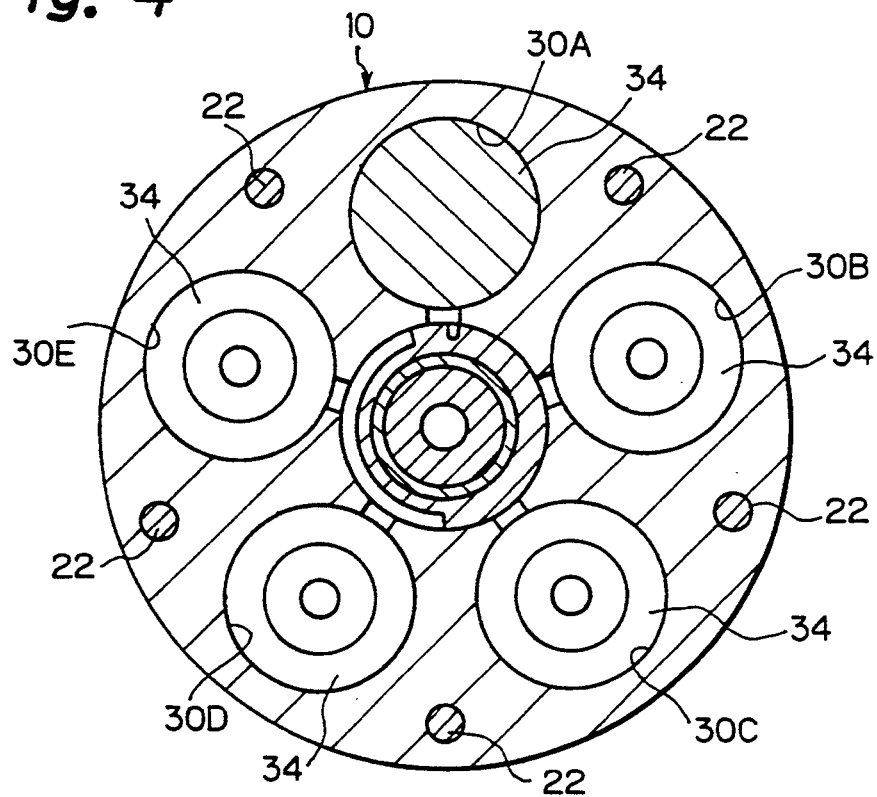
FIG. 4 is a cross-sectional view taken along a IV—IV line of FIG. 1.
Figure 5:
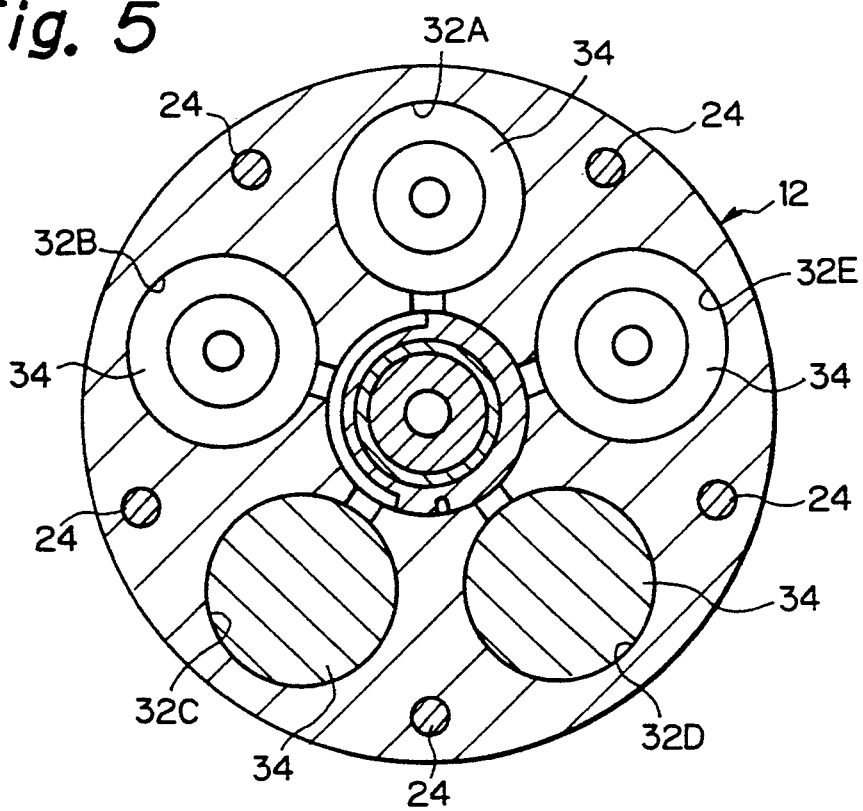
FIG. 5 is a cross-sectional view taken along a V—V line of FIG. 1.

The combined cylinder blocks 10 and 12 define a suction chamber or swash-plate chamber 26 for accommodating a swash plate 28, and have five cylinder bores 30A to 30E and 32A to 32E formed radially and circumferentially therein and spaced from each other at regular intervals, respectively, as shown in FIGS. 4 and 5. The cylinder bores 30A to 30E of the cylinder block 10 are aligned and in register with the cylinder bores 32A to 32E of the cylinder block 12, respectively, and each pair of the aligned cylinder bores of the blocks 10 and 12 slidably receives a double-headed piston 34 operatively engaged with the swash plate 28 through the intermediary of a pair of shoe elements 36 and 34 (FIG. 1), in such a manner that the piston 34 is reciprocated in the aligned cylinder bores by a rotational movement of the swash plate 28. The front cylinder block 10 has an inlet port 35 formed therein, through which the swash-plate chamber or suction chamber 26 communicates with the evaporator of an air-conditioning system (not shown) incorporated in a vehicle such as an automobile, so that the chamber 26 is supplied with a refrigerant, including a lubricating-oil mist therefrom.

As shown in FIG. 1, the combined cylinder blocks 10 and 12 have central axial bores formed therein, respectively, which receive a drive shaft 38 extending through the swash plate chamber 26. The drive shaft 38 is rotatably supported by a pair of tapered roller bearings 40 and 42 incorporated in the annular valve plates 18 and 20, respectively. One end portion of the drive shaft 38 is extended through an end wall of the front housing 14 so as to be operatively connected to the prime motor of the vehicle for rotation of the drive shaft 38. The protruded end portion of the drive shaft 38 is surrounded by a sleeve element integrally extended from the end wall of the front housing 14, and is sealed by a lip seal unit 44 contained within the sleeve element of the front housing 14, to prevent the refrigerant from leaking out of the compressor.

The bearing 40 is received in an annular portion 46 integrally projected from the front valve plate 18, and includes an inner race 40a, an outer race 40b, and a plurality of tapered roller elements 40c provided therebetween. As is apparent from FIG. 1, the inner race 40a is abutted against a shoulder formed around the drive shaft 38, and the outer race 40b is abutted against a pre-loaded annular ring spring 48 which is constrained between said outer race 40b and projections 50 integrally protruded from an inner end wall face of the front housing 14. Similarly, the bearing 42 is received in an annular portion 52 integrally projected from the rear valve plate 20, and includes an inner race 42a, an outer race 42b, and a plurality of tapered roller elements 42c provided therebetween. The inner race 42a is abutted against a shoulder formed around the drive shaft 38, and the outer race 42b is abutted against projections 54 integrally protruded from an inner end wall face of the rear housing 16.

The swash plate 28 is securely mounted on the drive shaft 38 within the swash plate chamber 26, and thus is rotationally driven by the prime motor of the vehicle. The swash plate 28 is subjected to thrust and radial loads during an operation of the compressor, but these loads are borne by the above-mentioned bearing arrangement.

The front housing 14 defines a front discharge chamber 56 together with the front valve plate 18, and the rear housing 16 defines a rear discharge chamber 58 together with the rear valve plate 20. The front and rear discharge chambers 56 and 58 communicate with each other through a central passage 60 formed in the drive shaft 38. As shown in FIG. 1, the central passage 60 communicates with the front discharge chamber 56 through radial ports 62 formed in the drive shaft 38, and the central passage 60 is opened to the rear discharge chamber 58 at the rear end of the drive shaft 38. The front housing 14 has an outlet port 63 formed therein, through which the front discharge chamber 56 communicates with the condenser of the air-conditioning system.

Figure 2:
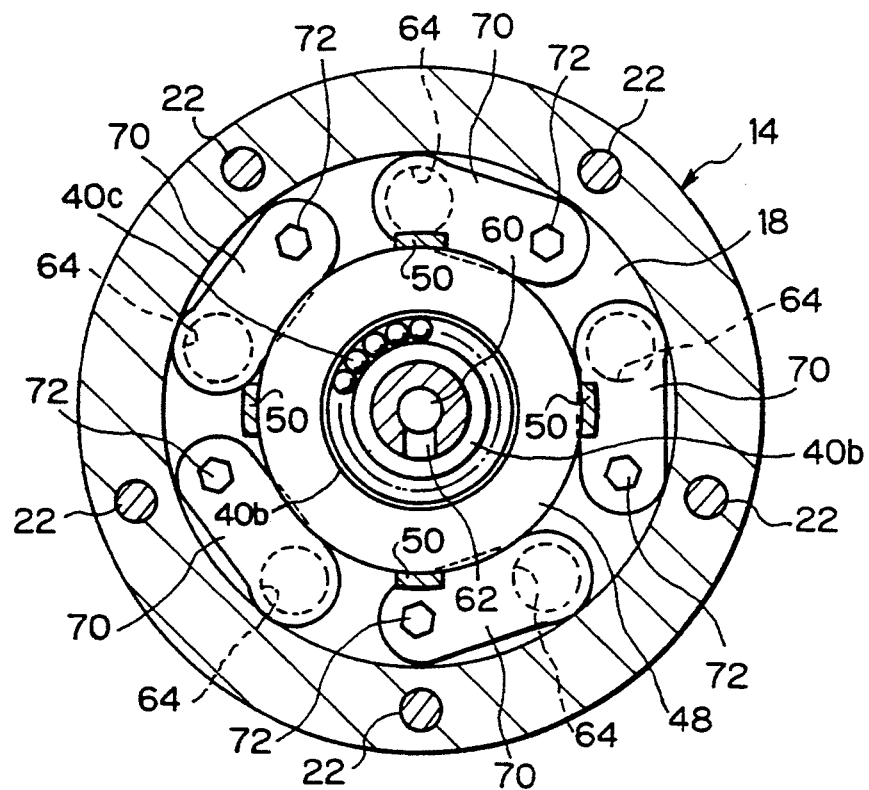
FIG. 2 is a partial enlarged view of FIG. 1.
Figure 3:
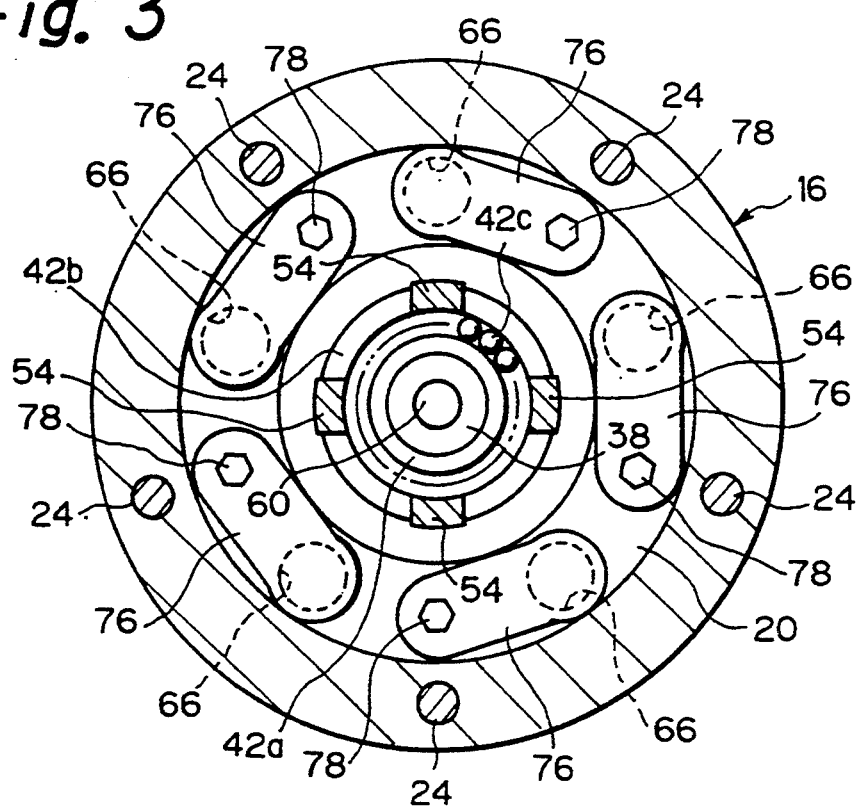
FIG. 3 is a cross-sectional view taken along a II—II line of FIG. 1.

As shown in FIG. 2, the front valve plate 18 has five discharge ports 64 formed radially and circumferentially therein and spaced from each other at regular intervals, and the discharge ports 64 are aligned with the cylinder bores 30A to 30E formed in the front cylinder block 10, respectively. Similarly, as shown in FIG. 3, the rear valve plate 20 have five discharge ports 66 formed radially and circumferentially therein and spaced from each other at regular intervals, and the discharge ports 66 are aligned with the cylinder bores 32A to 32E formed in the rear cylinder block 20, respectively. The front valve plate 18 is provided with five pairs of discharge reed valve elements 68 and reed valve retainers 70 securely attached thereto by bolts 72, respectively, and the discharge reed valve elements 68 are arranged such that each of the discharge reed valve elements 68 closes a corresponding discharge port 64. Similarly, the rear valve plate 20 is provided with five pairs of discharge reed valve elements 74 and reed valve retainers 76 securely attached thereto by bolts 78, respectively, and the five discharge reed valve elements 74 are arranged such that each of the discharge reed valve elements 74 closes a corresponding discharge port 66. Note, only one of the valve elements 68 and only one of the valve elements 74 are visible in FIG. 1.

Figure 6:
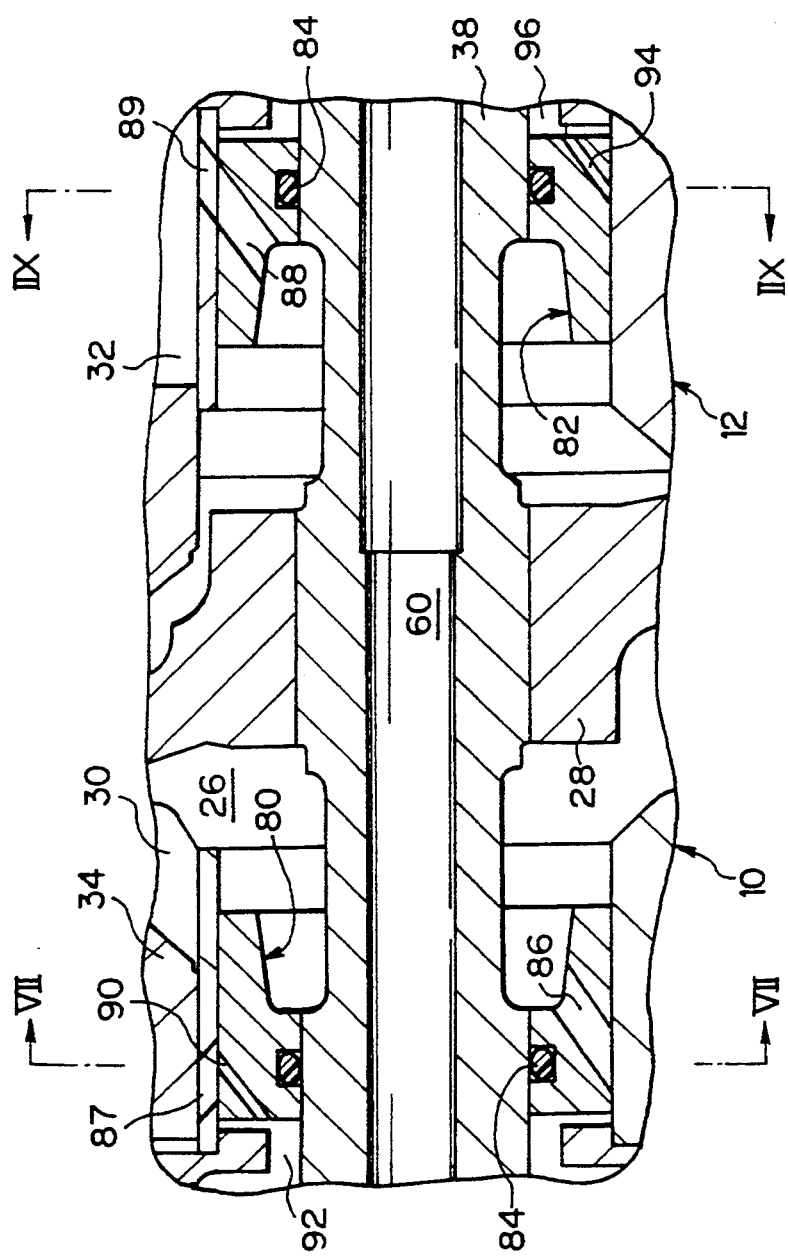
FIG. 6 is a partial enlarged view of FIG. 1.

In this embodiment, two rotary suction valves 80 and 82 are securely mounted on the drive shaft 38, and are slidably and hermetically received in the central axial bores of the front and rear cylinder blocks 10 and 12, respectively. As shown in FIG. 6, an O-ring seal 84 is provided between the drive shaft 38 and the respective rotary suction valves 80 and 82 to thereby prevent a communication between the suction chamber 26 and the discharge chambers 56 and 58. During the operation of the compressor, the rotary suction valves 80 and 82 are rotated together with the drive shaft 38, and a rotational direction thereof is indicated by an arrow R in FIGS. 7 and 8.

Figure 7:
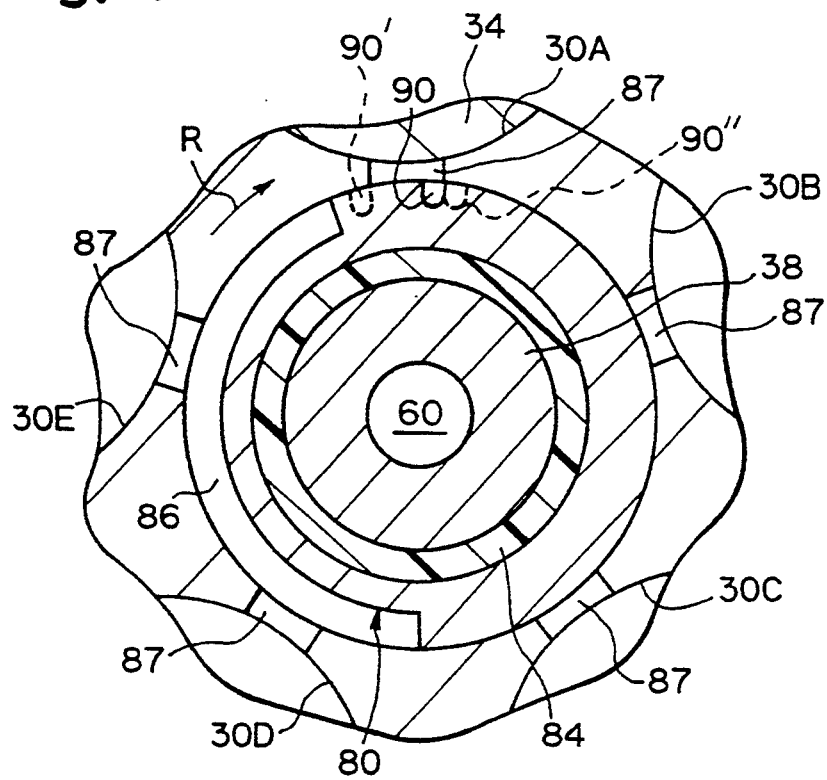
FIG. 7 is a cross-sectional view taken along a VII—VII line of FIG. 6.

The rotary suction valve 80 has a suction passage 86 formed therein, and the suction passage 86 is arcuately extended as shown in FIG. 7. The suction passage 86 is opened to the suction chamber 26 at an inner side thereof, and an outer side of the arcuate suction passage 86 is opened on an outer periphery of the rotary suction valve 80. As is apparent from FIGS. 6 and 7, each of the cylinder bores 30A to 30E is provided with a suction port 87 formed in the inner wall defining the central axial bore of the front cylinder block 10, and is disposed in the vicinity of the outer opening end of the cylinder bore concerned. The five suction ports 87 are arranged along a circle described by the arcuate outer opening of the suction passage 86 during the rotation of the rotary suction valve 80, and thus each of the cylinder bores 30A to 30E is intermittently communicated with the suction chamber 26 through the suction port 87 and the suction passage 86 over a given period which is determined by the arcuate length of the suction passage 86 and by the rotational speed of the rotary suction valve 80.

Figure 8:
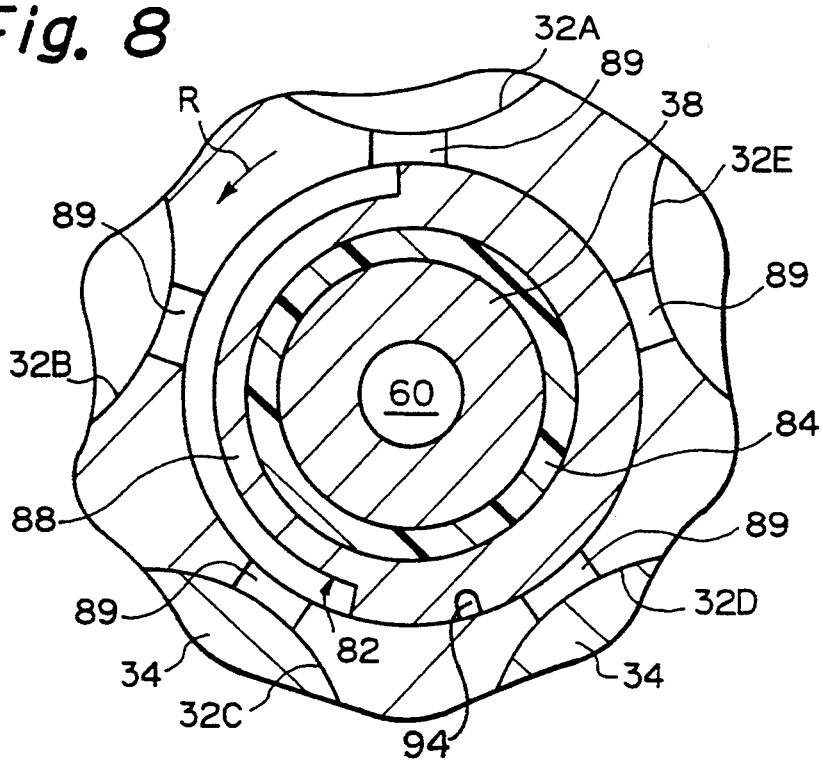
FIG. 8 is a cross-sectional view taken along a IIX—IIX line of FIG. 6.

Similarly, the rotary suction valve 82 has a suction passage 88 formed therein, and the suction passage 88 is arcuately extended as shown in FIG. 8. The suction passage 88 is opened to the suction chamber 26 at an inner side thereof, and an outer side of the arcuate suction passage 88 is opened on an outer periphery of the rotary suction valve 82. As is apparent from FIGS. 6 and 8, each of the cylinder bores 32A to 32E is provided with a suction port 89 formed in the inner wall defining the central axial bore of the front cylinder block 12, and is disposed in the vicinity of the outer opening end of the cylinder bore concerned. The five suction ports 89 are arranged along a circle described by the arcuate outer opening of the suction passage 88 during the rotation of the rotary suction valve 82, and thus each of the cylinder bores 32A to 32E intermittently communicates with the suction chamber 26 through the suction port 89 and the suction passage 88 over a period which is determined by the arcuate length of the suction passage 88 and by the rotational speed of the rotary suction valve 82. Note, the arcuate length of the suction passage 88 and the rotational speed of the rotary suction valve 82 are the same as the suction passage 86 and the rotary suction valve 80, respectively.

The rotary suction valve 80 further has a small passage 90 formed therein, and the small passage is disposed in the vicinity of the leading edge of the arcuate suction passage 86, as shown in FIG. 7. The small passage 90 is opened at an end thereof to an annular space 92 defined by an outer end face of the rotary suction valve 80, an inner annular edge of the valve plate 18, the annular bearing 40, and the drive shaft 38, as best shown in FIG. 6. The other end of the small passage 90 is opened on the periphery of the rotary suction valve 80, and is successively passed over the openings of the suction ports 87 during the rotation of the rotary suction valve 80, so that the suction ports 87 can be successively communicated with the space 92 through the small passage 90.

Similarly, the rotary suction valve 82 further has a small passage 94 formed therein, and the small passage is disposed in the vicinity of the leading edge of the arcuate suction passage 88, as shown in FIG. 8. The small passage 94 is opened at an end thereof to an annular space 96 defined by an outer end face of the rotary suction valve 82, an inner annular edge of the valve plate 20, the annular bearing 42, and the drive shaft 38, as best shown in FIG. 6. The other end of the small passage 94 is opened on the periphery of the rotary suction valve 82, and is successively passed over the openings of the suction ports 89 during the rotation of the rotary suction valve 82, so that the suction ports 87 can be successively communicated with the space 96 through the small passage 94.

Note, the respective annular spaces 92 and 96 are in communication with the discharge chambers 56 and 58 through clearances among the parts of the bearings 40 and 42.

Figure 9:
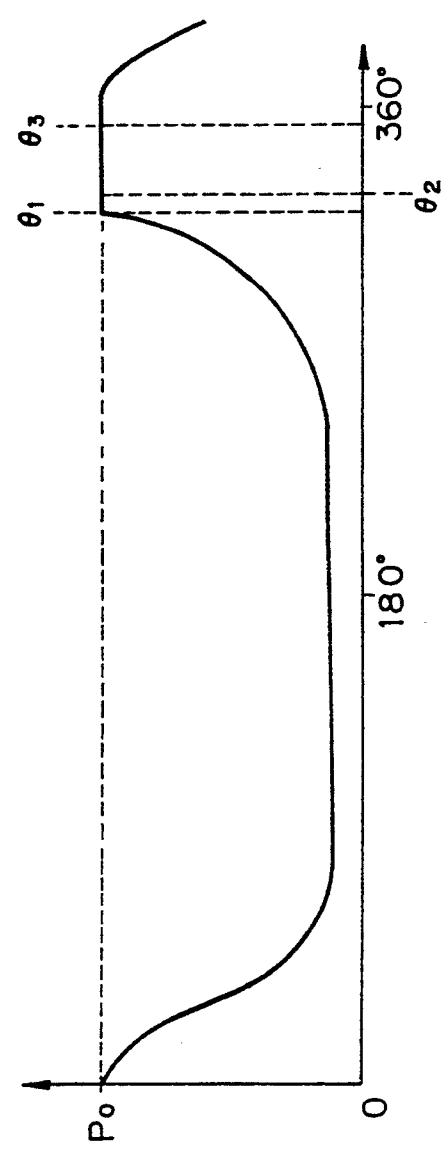
FIG. 9 is a graph showing an operational characteristic of the compressor shown in FIGS. 1 to 8.

The arcuate length of the suction passages 86 and 88 and the positioning of the small passages 90 and 96 are selected such that the compressor has an operational characteristic as shown in a graph of FIG. 9. Note, in this graph, the abscissa indicates a rotational angle of the rotary suction valves 80 and 82, and the ordinate indicates a pressure in the cylinder bores 30A to 30E and 32A to 32E.

The operation of the compressor will be now explained:

1) For example, when a compression stroke is just finished in the cylinder bore 30A, i.e., when the piston 34 concerned is at the top dead point in the cylinder bore 30A, the rotary suction valve 80 is at an angular position corresponding to the origin of the graph of FIG. 9. At this point of time, the cylinder bore 30A has a maximum pressure $P_0$ as the result of the compression stroke just previously executed by the piston 34.

2) Just after a suction stroke is initiated in the cylinder bore 30A, the pressure therewithin is abruptly lowered, as shown in the graph of FIG. 9, and the leading edge of the arcuate suction passage 86 immediately reaches the opening of the suction port 87 of the cylinder bore 30A (FIG. 7), so that the refrigerant is introduced from the suction chamber 26 into the cylinder bore 30A through the arcuate suction passage 86 and the suction port 87. The introduction of the refrigerant into the cylinder bore 30A is continued until the rotational angle of the rotary suction valve 80 reaches 180° (FIG. 9), i.e., until the trailing edge of the arcuate suction passage 86 is passed over the opening of the suction port 87 of the cylinder bore 30A (FIG. 7).

3) As soon as the suction stroke is finished, a compression stroke is initiated in the cylinder bore 30A. During the compression stroke, the introduced refrigerant is compressed in the cylinder bore 30A, so that a pressure thereof is increased. When the rotational angle of the rotary suction valve reaches $\theta_1$ (FIG. 9), the compressed refrigerant has the maximum pressure $P_0$ so that the discharge reed valve 64 concerned is opened to thereby cause a discharging of the compressed refrigerant into the front discharge chamber 56.

4) Just after the discharging of the compressed refrigerant into the front discharge chamber 56 is initiated, the rotational angle of the rotary suction valve 80 reaches $\theta_2$ (FIG. 9). At this point of time, the small passage 90 of the rotary suction valve 80 is at a position as indicated by reference 90' in FIG. 7. Then, a part of the compressed refrigerant is fed to the annular space 92 through the suction port 87 and the small passage 90, and contributes to lubricate the movable parts of the bearing 40 and the sliding surfaces provided by the rotary suction valve 80 and the central axial bore of the cylinder block 10.

5) When the rotational angle of the rotary suction valve 80 reaches $\theta_3$ (FIG. 9), the small passage 90 of the rotary suction valve 80 is at a position as indicated by reference 90" in FIG. 7, so that the feeding of the refrigerant into the annular space 92 is ended. Then, the rotational angle of the rotary suction valve 80 reaches 360° (FIG. 9), and thus the compression stroke is finished.

Note, the sequence as mentioned above is true for each of the cylinder bores 30B to 30E, and also is true for each of the cylinder bores 32A to 32E except that the sequence occurs out of phase by 180°.

As is apparent from the foregoing, according to the present invention, the refrigerant can be introduced from the suction chamber into the cylinder bore just after the suction stroke is initiated therein, and the introduction of the refrigerant into the cylinder bore is continued until the suction stroke is finished. Accordingly, a sufficient amount of the refrigerant is fed to the cylinder bore during the suction stroke, whereby the compressor can fully exhibit an operational performance thereof.

Also, according to the present invention, no through passages are formed in the front and rear cylinder blocks, and thus the cylinder blocks can have a small size. Accordingly, it is possible to compactly construct the compressor.

Finally, it will be understood by those skilled in the art that foregoing description is of preferred embodiments of the disclosed device, and that various changes and modifications may be made to the present invention without departing from the spirit and scope thereof.

We claim:

1. An axial multi-piston compressor comprising:
a drive shaft;
a cylinder block having a central axial bore through which said drive shaft is extended, and cylinder bores radially formed therein surrounding said drive shaft;
a plurality of pistons slidably received in the cylinder bores of said cylinder block, respectively;
a conversion means for converting a rotational movement of said drive shaft into a reciprocation of each piston in the corresponding cylinder bore such that a suction stroke and a compression stroke are alternately executed therein, a gas being introduced into each of the cylinder bores during the suction stroke thereof, and then the introduced gas being compressed and discharged from said cylinder bore during the compression stroke thereof;
a rotary suction valve means mounted on said drive shaft and received hermetically in the central axial bore of said cylinder block for allowing the introduction of the gas into each of the cylinder bores during the suction stroke thereof, said rotary suction valve means having a suction passage formed therein and opened on a periphery thereof, each of the cylinder bores having a suction port formed in an inner wall defining the central axial bore of the cylinder block, the suction ports of the cylinder bores being arranged along a circle described by the opening of said suction passage during a rotation of said rotary suction valve means; and
a discharge valve means associated with a discharge port positioned at an end face of each of the cylinder bores for allowing the discharge of the compressed gas from said cylinder bore into a discharge chamber during the compression stroke thereof, each of said suction ports being disposed in the vicinity of the discharge port of the corresponding cylinder bore, the suction passage of said rotary suction valve means being arranged such that the introduction of the fluid into the cylinder bore concerned is carried out just after the suction stroke is initiated therein, and is continued until the suction stroke is finished, whereby an operational performance of the compressor can be enhanced, wherein said rotary suction valve means has a small passage formed therein, and said small passage is disposed such that a part of the gas compressed in the cylinder bore concerned is discharged from said cylinder bore into said discharge chamber over a part of an ending period of the compression stroke, whereby said rotary suction valve means can be lubricated.

2. An axial multi-piston compressor as set forth in claim 1, wherein the suction passage of said rotary suction valve means is arcuately extended therein.

3. An axial multi-piston compressor as set forth in claim 1, wherein said gas comprises a refrigerant which includes a lubricating-oil mist.

4. An axial multi-piston compressor comprising:
a drive shaft;
a first cylinder block having cylinder bores formed therein and surrounding said drive shaft;
a second cylinder block having cylinder bores formed therein and surrounding said drive shaft, the cylinder bores of said first cylinder block being aligned and registered with the cylinder bores of said second cylinder block, respectively, said first and second cylinder blocks being arranged so as to define a suction chamber therebetween;
a plurality of double-headed pistons slidably received in the pairs of aligned cylinder bores, respectively;
a first housing associated with said first cylinder block to define a first discharge chamber therebetween;
a second housing associated with said second cylinder block to define a second discharge chamber therebetween;
said first and second discharge chambers communicating with each other through a central passage formed in said drive shaft;
a conversion means disposed within said suction chamber for converting a rotational movement of said drive shaft into a reciprocation of each double-headed piston in the corresponding aligned cylinder bores such that a suction stroke and a compression stroke are alternately executed therein, a gas being introduced from said suction chamber into each of the cylinder bores during the suction stroke thereof, and then the introduced gas being compressed and discharged from said cylinder bore into the corresponding discharge chamber during the compression stroke thereof;
a first rotary suction valve means for introducing the gas from said suction chamber into each of the cylinder bores of said first cylinder block during the suction stroke thereof, said first rotary suction valve means having a small passage formed therein, said small passage being disposed such that a part of the gas compressed in the cylinder bore concerned is discharged from said cylinder bore into said first discharge chamber over a part of an ending period of the compression stroke, whereby said first rotary suction valve means can be lubricated; and
a second rotary suction valve means for introducing the gas from said suction chamber into each of the cylinder bores of said second cylinder block during the suction stroke thereof, said second rotary suction valve means having a small passage formed therein, said small passage being disposed such that a part of the gas compressed in the cylinder bore concerned is discharged from said cylinder bore into said second discharge chamber over a part of an ending period of the compression stroke, whereby said second rotary suction valve means can be lubricated.

5. An axial multi-piston compressor as set forth in claim 4, wherein each of said first and second rotary suction valve means is constituted such that the introduction of the fluid into the cylinder bore concerned is carried out just after the suction stroke is initiated therein, and is continued until the suction stroke is finished, whereby an operational performance of the compressor can be enhanced.

6. An axial multi-piston compressor as set forth in claim 4, wherein said gas comprises a refrigerant which includes a lubricating-oil mist.

* * * * *